US005420615A

United States Patent [19]

Witz et al.

[11] Patent Number: 5,420,615

[45] Date of Patent: May 30, 1995

[54] UNITARY BODY PLOTTER PEN

[75] Inventors: Wolfgang Witz, Easton, Pa.; Bernd Bastiansen, Hamburg, Germany

[73] Assignee: Koh-I-Noor Inc., Bloomsbury, N.J.

[21] Appl. No.: 5,558

[22] Filed: Jan. 19, 1993

[30] Foreign Application Priority Data

Jan. 18, 1992 [DE] Germany ........................ 42 01 268.6

[51] Int. Cl.[6] .............................................. G01D 15/16

[52] U.S. Cl. .................................................. 346/140.1

[58] Field of Search ............ 346/104 A, 140 R, 140.1; 401/260, 259, 258

[56] References Cited

U.S. PATENT DOCUMENTS

| | | | |
|---|---|---|---|
| 4,382,707 | 5/1983 | Anderka | 401/198 |
| 4,556,336 | 12/1985 | Sano et al. | 401/199 |
| 4,662,769 | 5/1987 | Goh | 401/259 |
| 4,728,214 | 3/1988 | Mutschler | 401/260 |
| 4,928,121 | 5/1990 | Raahauge | 346/140 A |
| 4,930,921 | 6/1990 | Anderka | 401/259 |
| 5,172,995 | 12/1992 | Felgentreu . | |

FOREIGN PATENT DOCUMENTS

| | | |
|---|---|---|
| 2625465 | 1/1988 | France . |
| 2844886 | 8/1979 | Germany . |
| 3207219 | 10/1983 | Germany . |
| 3420287 | 5/1984 | Germany . |
| 3903606 | 8/1990 | Germany . |
| 4013510 | 10/1991 | Germany . |

*Primary Examiner*—Benjamin R. Fuller
*Assistant Examiner*—N. Le
*Attorney, Agent, or Firm*—Fitzpatrick, Cella, Harper & Scinto

[57] ABSTRACT

A unitary plotter pen construction useful as a disposable plotter pen. A writing tube is provided centrally and at the front end of a unitary hard plastic body element that defines a writing tube nib; a housing for a soft plastic pressure equalization chamber and an ink reservoir; and an adaptor structure for mounting with a plotter head. An axially extending pressure-equalization chamber is defined by soft plastic, lamella vent channel element that is inserted from the rear and axially against inner surfaces of the hard plastic body element. An upper end of the pressure-equalization chamber connects to the ink supply and a lower end connects to ambient air, through an annular cavity at the front end of the unitary body element. That annular cavity also may include transverse capillary spaces as a further protection against ink leakage from the pressure equalization chamber.

8 Claims, 2 Drawing Sheets

UNITARY BODY PLOTTER PEN

BACKGROUND OF THE INVENTION

1. Field of Invention

The invention relates to a unitary body plotter pen, and in particular a construction useful as a disposable plotter pen. A writing tube is provided centrally and at the front end of a unitary hard plastic body element that defines a writing tube nib; a housing for a soft plastic pressure equalization chamber and an ink reservoir; and an adaptor structure for mounting with a plotter head. As used hereinafter, the terms "soft" or "softer" plastic connote an elastic deformability that is relatively greater than that of a "hard" or "harder" plastic. The writing tube is fixed axially at the front end of a harder plastic unitary body element and axially connects to a writing ink storage space defined proximate to a rearwardly open, rear end of the body element. An axially extending pressure-equalization chamber is defined below the writing ink storage space by softer plastic vent channel structure that is inserted axially against the inner surface of the body element. The pressure-equalization chamber has a rear end that connects to a central bore communicating with the writing ink storage space and a front end that connects to the ambient air, through an annular area at the front end of the body element. That annular area also may include transverse capillary spaces as a further protection against ink leakage from the vent channel of the pressure equalization chamber.

2. Brief Description of the Prior Art

In the case of one known plotter pen of this type (Germany Off. DE 40 13 510, U.S. Pat. No. 5,172,995), a pressure-equalization chamber has one end that is connected to the writing ink storage space near a front area of the pen; a connection to ambient air that is provided at a rear end of the pen; and a spiral-shaped pressure-equalization chamber that extends from rear to front. The rear end also extends into a space filled with a flexible, open-pored material, such as a foam. This open-pored material exhibits capillary spaces, and is connected to the ambient air by a rearward extending bore. Hence, if there is an inner pressure increase so strong that the entire pressure-equalization chamber is filled with writing ink (due to a sudden temperature increase, for example) then any writing ink reaching the rear end of the pressure-equalization chamber will be sucked up by the open-pored material. There is, therefore, no danger of free writing ink escaping from the pressure-equalization chamber and into the environment. However, once the flexible, open-pored material has sucked up excess writing ink, further through-flow of air may be obstructed, and that condition may bring about a reduction in maximum plotter pen writing speed.

OBJECTS AND SUMMARY OF THE INVENTION

A first object is to define a plotter pen, and in particular a disposable plotter pen used for graphic plotters, with a basic structure that minimizes the problem of excessive Total Indicated Runout (TIR), which is inherent in pens that are assembled from several components, and particularly component pieces that must be assembled in a concentric fashion. A minimized TIR ensures more accurate placement of different plotter pen points at the exact same location of a drawing surface. A single harder plastic body element that acts as a nib to support an axially placed writing tube and also has an outer diameter which defines the mounting geometry needed for direct interconnection with various plotter heads is an essential aspect of this first object of the invention.

A second object of this invention is to provide a plotter pen structure that comprises fewer component pieces, and permits axial insertion of a soft plastic, disposable venting channel/ink reservoir cartridge assembly from the open rear of a hard plastic body element, wherein ease of assembly and resistance to ink leakage are not affected by the tightness of an interconnection of soft plastic against hard plastic. A unitary harder plastic body element is both the nib support for a writing tube and an adaptor structure for mounting the pen in a plotter head. The softer plastic engages against only internal wall structure of the body element, and the fit does not affect the concentricity of the writing tube with respect to the head of the plotter. The pressure equalization chamber is surrounded by the rearwardly, open harder plastic body element. The vent channel then will be defined by softer plastic lamella that can be inserted into the open rear of the body element and the pair of sealing discs have larger tolerances than would be the case if made from a harder plastic, without excessive axial pressure being required. Such a total plotter pen assembly, because of a relatively hard plastic body that also is unitary, is more resistant to those bending moments which are imposed by a plotter head mechanism during use, and tend to cause pen component separation and ink leakage.

A third object of this invention is to provide a plotter pen which further reduces the danger of any writing ink escaping from a pressure-equalization chamber and into the environment. In the preferred embodiment, the pressure-equalization chamber extends axially rearward, from an ambient air inlet connection proximate the front end area of the body element. According to this object, the front end area includes an annular space wherein the sealing disc element that extends transversely to the longitudinal axis of the plotter pen also include capillary duct spaces. Hence, any escaping ink will absorbed by the disc element and not be allowed to drip out of the front end area of the plotter pen.

It should be noted that the danger of ink leakage in a pen according to the preferred embodiment should be low, because the bore providing ink entry into the pressure-equalization chamber is situated in the rear area of the plotter pen and ambient air fills the ink reservoir towards the rear. Any ink moving towards the front end of the pen (and towards the bore permitting an entry into the pressure-equalization chamber) normally is prevented by capillary forces created by the lamella from escaping into the environment. Hence, generally there is little danger of writing ink being flung forwards out of the pen nib as a result of dropping the writing tube down onto a drawing surface. Even where there is an unfavorable elevation or movement of ink in the pressure-equalization chamber, the release of any ink out of the vent channel front end is prevented by structure according to the third object of the invention.

In order to achieve these objects of the invention, a plotter pen designed according to the invention comprises a soft plastic vent channel structure that cooperates with the axially extending interior of a unitary hard plastic body element to define a pressure-equalization chamber. It also is preferred that the front end of the pressure-equalization chamber be located closer to the writing tube tip, than in known plotter pens. The unitary body element has a front end that connects the vent channel to ambient air, and that front end area preferably includes an annular cavity that easily may support a disc element portion which is an integral part of the front end of the vent channel structure. Such a disc element may then easily also include capillary ducts that extend axially into the annular cavity transversely to the longitudinal axis of the pen. Any writing ink forced beyond the front end of the pressure-equalization chamber then will enter into those capillary ducts, and thus be prevented from being flung out or otherwise escaping directly to ambient air when the writing instrument is shaken, for example. Any escaping writing ink instead will be drawn into the capillary ducts and retained therein.

In a preferred construction, the disc element has a bleed passage or opening connected to the front end of the pressure-equalization chamber and any capillary ducts will be provided on the side of the disc element which faces away from the pressure-equalization chamber. Any excess writing ink that exits from the pressure-equalization chamber is urged towards the side of the disc element facing away from the said chamber. Escaping ink then will not further move axially forward in the direction of the ambient air passage, and pooling of any considerable quantity of writing ink at the exit of the pressure-equalization chamber is prevented.

The disc element further may comprise an inner, circular capillary duct, from which rectilinear capillary duct sections may extend outwardly so as to intersect at right angles with other rectilinear capillary duct areas. In a particularly preferred construction according to this object of the invention, the disc element is configured as an integral part of the front sealing element for the soft plastic vent channel structure, to thereby define the front end of the pressure-equalization chamber.

The invention is explained in greater detail below with reference to the drawings, which show an illustrative embodiment in diagrammatic and simplified representation.

DETAILED DESCRIPTION OF THE EMBODIMENTS

Figure 1:
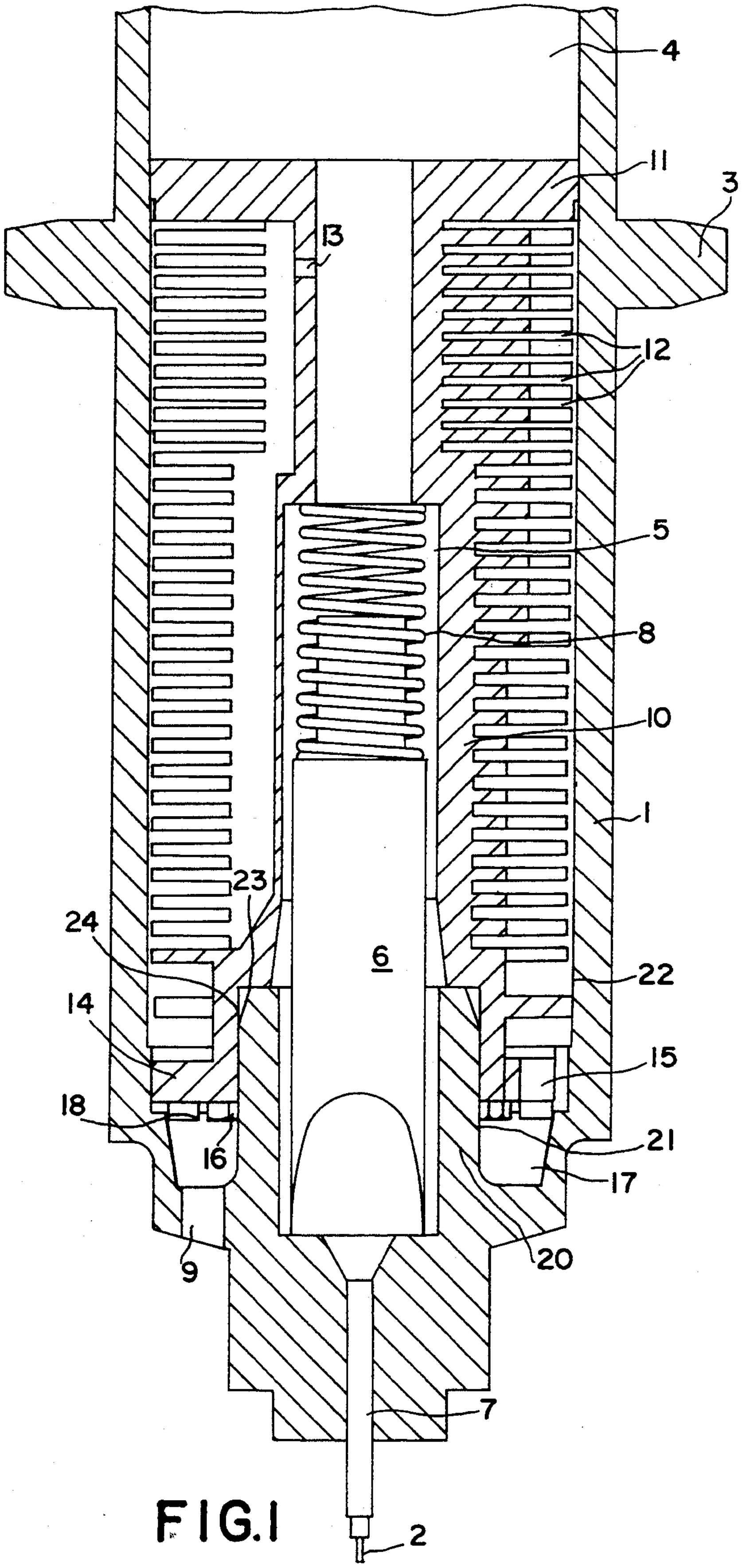
FIG. 1 is an axial section through the front part of a preferred plotter pen embodiment that comprises all the objects of the disclosed invention.

FIG. 1 illustrates an embodiment having structure to meet all three objects of the invention, and basically comprises a single hard plastic body element 1 which acts both as a nib to directly support an axially placed writing tube 7, and further has a cylindrical outer diameter geometry that defines a direct mounting interconnection with certain common plotter heads, such as those manufactured by Hewlett-Packard ®. A cleaning wire 2 extends into writing tube 7 in the usual manner, and is fastened to the front end of a drop-weight member 6. A hermetically sealing cap (not shown) also may be secured easily, in a conventional manner. Since the cap will engage over the hard plastic nib portion that surrounds and securely holds the writing tube, a good hermetic seal is easier to achieve.

An annular collar 3 is shown in FIG. 1 to be at an axial location significantly above the front end of the unitary body element 1. This collar as illustrated, together with a particular outer diameter of the unitary body element, is formed to match the configuration needed to hold a plotter pen directly in the head of a graphics plotter from the Hewlett-Packard family of plotters. Of course, other plotter pen geometries easily can be imposed upon the unitary body element 1 in order to fit other plotter head designs. Alternatively, a universal geometry could be imposed on the unitary body element, so that a set of encircling hard plastic adaptors will permit mounting of the plotter pen within several plotter heads.

The unitary body element 1 further serves to define an axially extending annulus, between an outer surface 21 of a central cylindrical element 20 and an inner surface 22 of the axially extending cylindrical portion of body element 1. FIG. 1 further shows a soft plastic element, disposable venting channel cartridge assembly 10 in place against central cylindrical element 20, after an axial insertion from the open rear end of the hard plastic body element 1. As shown in FIG. 1, the soft plastic outer surface of the soft plastic element venting channel cartridge assembly 10 further comprises a front sealing disc 14, a rear sealing disc 11, and a vent channel comprising lamella 12. This soft plastic structure cooperates with the hard plastic defining a smooth cylindrical interior surface of the body element 1, so as to define a pressure equalization chamber.

In the preferred embodiment, the pressure-equalization chamber is formed by the soft plastic lamella as illustrated in the vertical cross-section of FIG. 1 having annular indentations. An outwardly open vent channel structure is defined by lamella, which preferably have radial outer surfaces ends that are spaced so as to just touch, or for example fit inwardly about 0.003 inches nominally from, the smooth interior wall surface of the body element 1. This is no intention to provide an additional axial flow path between the outer edges of the individual lamella elements and the inner diameter of the body element, and ink in any such radial spaces will tend to remain there, due to capillary forces. The adjacent annular spaces between lamella elements are communicated through one or more axially extending notches. Accordingly, it is the interference fit between the unitary body element 1 and the front and rear sealing discs, 14 and 11, which control the axial insertion effort required upon assembly, and that pressure typically is kept below about 15 pounds of pressure.

The writing tube can be axially located with respect to an outer diameter of 0.455 inches for the hard plastic body element 1, to a tolerance of ±0.001 inches using conventional plastic molding and tube assembly technique with a relatively hard plastic such as ABS plastic, or Noryl ® plastic resin available from General Electric Company, for example. The inner diameter of a soft plastic element typically is made to a tolerance no better than ±0.002 inches for polyethylene, polypropylene and similar conventional polyolefin plastics useful for ink cartridges and vent channel elements. Likewise, the outer diameter of a soft plastic element typically is made to a tolerance no better than ±0.002 inches. However, the TIR tolerances of a plotter pen as shown in FIG. 1 can be held to about ±0.002 inches, since the TIR is not at all affected by the tightness or concentricity of any of the internal interconnections, between softer plastic and harder plastic. In conventional disposable plotter pens for the Hewlett-Packard ® plotter family, such as the Model 64E manufactured by Koh-I-Noor Inc. of Bloomsbury, N.J., the TIR is greater because there are tolerances that accumulate between a separate writing tube support nib and a surrounding housing or further adaptor. Likewise, if a separate hard plastic nib first is connected to a soft plastic cartridge, and then that assembly is inserted into a hard plastic body or adaptor, there will be two or more concentricity tolerance additions due to the concentric fitting requirements.

According to the first object of the invention, a Unitary hard plastic body element is both the nib support for a writing tube and the adaptor structure for mounting the pen in a plotter head, so as to minimize both TIR and manufacturing costs, with reference to a plotter pen construction requiring the assembly of more components.

According to a second object of the invention, the soft plastic of a pressure equalization chamber also engages against only internal wall structure of the body element. As a result, the fitting of a pressure equalization chamber cartridge, with or without an associated ink reservoir portion to that cartridge, will not affect the resistance of the assembly to resist the bending moments applied by the plotter head, and the resistance to ink leakage.

FIG. 1 also illustrates that there is an inner bore defined by the central cylindrical element 20 portion of the hard plastic body element 1 that aligns with an inner bore 5 formed in the soft plastic element. This assembled bore structure serves to permit ink flow from an ink reservoir 4, that also may be a rearward portion of the unitary body element 1 as shown in FIG. 1. Ink travels downward towards the writing tube 7 through the central bore 5, which is configured also to restrain the drop weight 6 and the associated spring 8. The ink reservoir also may be a rearward part of the soft plastic element vent channel cartridge assembly 10 that contains about 1.5 cc. of ink. Alternatively, a separate ink reservoir cartridge may be employed, that will interlock to a vent channel assembly as illustrated in FIG. 1, as it is pushed axially within the rearward end of the unitary body.

The central bore 5 is formed by an essentially cylindrical section of the inserted soft plastic element vent channel cartridge assembly 10 and by a front area of the body element 1, and is large enough to assist in unimpeded air bubble ascent, around the outer diameter of the drop weight. The drop-weight 6 is pressed forwards by the helical spring 8, which is supported by its front end against an annular shoulder on the drop-weight member 6 and by its rear end against an annular shoulder in the inner bore 5. The front end of the cleaning wire 2 thereby protrudes in the usual manner out of the front end of the writing tube 7, and is restrained to move axially up and down, along the pen axis, in response to a contact of the pen tip on a drawing surface.

Ink flowing downwardly from reservoir 4, around the drop weight 6 and into the writing tube 7, will not leak outwardly from the central bore 5. This is due to a positive seat seal defined by an axial and radial contact between a soft plastic ledge structure 23, 24 and a transverse surface of hard plastic cylindrical element 20, as well as a tight radial compression of the soft plastic front sealing disc 14 in the annulus defined between the opposed hard plastic cylindrical surfaces 21 and 22. Ink within the central bore 5 is permitted to enter the pressure equalization chamber through a transverse port, or cross-bore 13 that is proximate the rear end of the element vent channel cartridge assembly 10. Cross-bore 13 also is proximate the rear end of the pressure equalization chamber. The pressure equalization chamber has a front end that communicates with annular cavity 17 through a bleed passage 15 in the front sealing disc 14. An ambient air entrance passage 9 spaced below annular cavity 17 is provided at the front end of the body element 1. As further illustrated in FIG. 1, an axial notch may interconnect the lamella to the left side of the central bore, below the cross-bore 13, and a further axial stepped notch may interconnect the lamella at an outer edge location of the lamella, to the right side of the central bore and above bleed passage 15. Air and ink travel within the pressure equalization chamber thereby can be facilitated.

According to the third object of the invention, an optional capillary system may be located as an outer surface to the sealing disc which extends axially into annular cavity 17, and also extends transversely to the longitudinal axis of the tubular pen nib. This optional capillary system preferably is formed as an integral part of the structure of a sealing disc 14 that is an integral part of the front end of the soft plastic element vent channel cartridge assembly element 10. Since the sealing disc element must have an outer periphery that hermetically seals against the interior structure side of the body element 1, an axial bleed passage 15 is formed therein that communicates ink or air between the pressure equalization chamber and an outer periphery of sealing disc 14.

Figure 2:
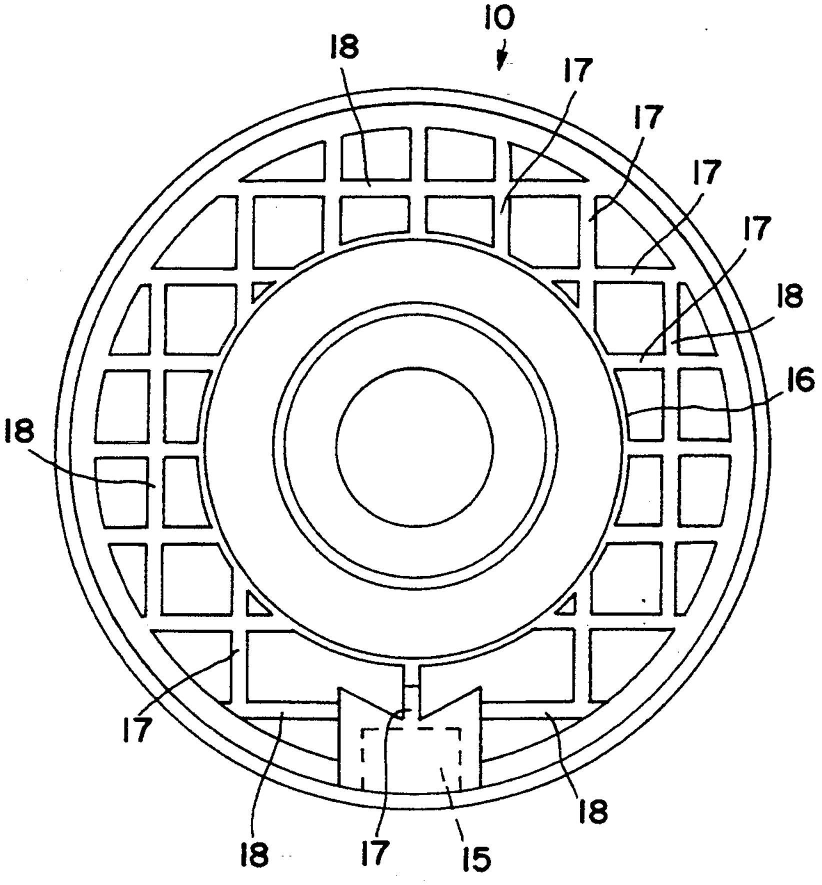
FIG. 2 is a front view of that part of the plotter pen shown in FIG. 1 which exhibits a disc element according to the third object of the invention.

In the illustrated preferred embodiment for this third object of the invention, the front side of the disc element 14, i.e. the side facing away from the pressure-equalization chamber is formed with capillary ducts. Those capillary ducts can be individually identified by reference to the preferred embodiment thereof shown in FIG. 2. The indentation configured on the inner marginal area forms, together with the adjacent wall area for the main member 1, a circular part-capillary duct 16, from which capillary duct sections 17 extend close to the outer periphery. These duct sections are intersected at right angles by rectilinear capillary duct areas 18, so that the capillary duct distribution as represented in FIG. 2 easily may be produced.

If writing ink is forced, due to an unusual pressure increase, out of the front end of the pressure-equalization chamber and through the bleed passage 15, that expressed ink makes its way into the area of the capillary duct areas 18 present on the front side of the disc element 14 and into the intermediate capillary duct section 17. The writing ink then is drawn by capillary forces away from the bleed passage 15 and into the capillary ducts on the front side of the disc element 14, where the ink is distributed among the ducts.

Unless the quantity of escaping writing ink becomes so great that the capillary ducts of the disc element 14 no longer are able to absorb the volume, writing ink will not be able to pass through the ambient air entrance passage 9 and be flung out, for example, by shaking the pen or by dropping the pen tip quickly onto a drawing surface. However, the disclosed construction for a pressure-equalization chamber is more voluminous than that the forced vent passages in a plotter pen Model 64E, for example, and the lamella system as illustrated should be adequate for all normal operating cases, on the one hand. On the other hand, the optional capillary ducts in the disc element 14 are able to absorb quickly any quantity of writing ink likely to escape in an unusual operating situation.

While a preferred embodiment of the invention has been shown and described, it is to be understood that the invention solely is to be defined by the scope of the appended claims.

We claim:

1. A tubular plotting pen having a writing ink reservoir, said plotting pen comprising:

(a) a unitary hard plastic body element having a front end and a rear end, said body element having an annular space proximate the front end thereof, said body element including a writing tube nib portion that holds a writing tube, a housing portion comprising a circular body potion, and an adaptor portion configured to allow mounting of said plotting pen within a plotter head, wherein said writing tube is fixed axially at the front end of said body element, wherein the rear end of said body element is rearwardly open, and wherein said body element has a central bore axially connecting said writing tube to the writing ink reservoir, the reservoir being disposed proximate to the rear end of said body element; and (b) a soft plastic vent channel element disposed within said housing portion at a location between the front and rear ends of said body element, said soft plastic vent channel element being inserted from the rear end of said body element in an axial direction into sealing engagement against a cylindrical inner surface of said body element at the location, said soft plastic vent channel element and said body element defining an axially extending pressure-equalization chamber therebetween;

wherein the pressure equalization chamber is communicated with writing ink in the central bore through a port in said soft plastic vent channel element that is proximate the rear end of said body element, and wherein the pressure equalization chamber is connected to ambient air through a passage in said body element that is proximate the front end of said body element; and wherein said soft plastic vent channel element comprises (i) transversely extending lamella of a diameter less than an inner diameter of said circular body portion of said body element, and (ii) a soft plastic annular sealing disc, that radially is compressed into sealing engagement by said body element within the annular space.

2. A tubular plotting pen having a writing ink reservoir, said plotting pen comprising:

(a) a unitary hard plastic body element having a front end and a rear end, said body element having an annular space proximate the front end thereof, said body element including a writing tube nib portion that holds a writing tube, a housing portion comprising a circular body portion, and an adaptor portion configured to allow mounting of said plotting pen within a plotter head, wherein said writing tube is fixed axially at the front end of said body element, wherein the rear end of said body element is rearwardly open, and wherein said body element has a central bore axially connecting said writing tube to the writing ink reservoir, the reservoir being disposed proximate to the rear end of said body element; and (b) a soft plastic vent channel element disposed within said housing portion at a location between the front and rear ends of said body element, said soft plastic vent channel element being inserted from the rear end of said body element in an axial direction into sealing engagement against a cylindrical inner surface of said body element at the location, said soft plastic vent channel element and said body element defining an axially extending pressure-equalization chamber therebetween;

wherein the pressure equalization chamber is communicated with writing ink in the central bore through a port in said soft plastic vent channel element that is proximate the rear end of said body element, and wherein the pressure equalization chamber is connected to ambient air through a passage in said body element that is proximate the front end of said body element; and wherein said soft plastic vent channel element comprises:

(i) transversely extending lamella of a diameter less than an inner diameter of said circular body portion;

(ii) a front sealing disc proximate a front end of said soft plastic vent channel element, said front sealing disc having a diameter equal to or greater than the inner diameter of said circular body portion; and (iii) a rear sealing disc proximate a rear end of said soft plastic vent channel element, said rear sealing disc having a diameter equal to or greater than the inner diameter of said circular body portion.

3. A tubular plotting pen having a writing ink reservoir, said plotting pen comprising:

(a) a unitary hard plastic body element having a front end and a rear end, said body element having an annular cavity proximate the front end thereof, said body element including a writing tube nib portion that holds a writing tube, the annular cavity being concentric to said writing tube, a housing portion comprising a circular body potion, and an adaptor portion configured to allow mounting of said plotting pen within a plotter head, wherein said writing tube is fixed axially at the front end of said body element, wherein the rear end of said body element is rearwardly open, and wherein said body element has a central bore axially connecting said writing tube to the writing ink reservoir, the reservoir being disposed proximate to the rear end of said body element; and (b) a soft plastic vent channel element, disposed within said housing portion at a location between the front and rear ends of said body element, said soft plastic vent channel element being inserted from the rear end of said body element in an axial direction into sealing engagement against a cylindrical inner surface of said body element at the location, said soft plastic vent channel element and said body element defining an axially extending pressure-equalization chamber therebetween;

wherein the pressure equalization chamber is communicated with writing ink in the central bore through a port in said soft plastic vent channel element that is proximate the rear end of said body element, and wherein the pressure equalization chamber is connected to ambient air through a passage in said body element that is proximate the front end of said body element; and wherein said plotting pen further comprises a disc element, disposed in the annular cavity, said disc element extending transversely to a longitudinal axis of said plotting pen and having capillary ducts formed therein.

4. A tubular plotting pen according to claim 3 wherein said soft plastic vent channel element has a bleed passage, the bleed passage communicating between the annular cavity and the pressure-equalization chamber, and wherein said disc element has capillary ducts provided on a side of said disc element that faces away from the pressure-equalization chamber, whereby the writing ink escaping from the pressure-equalization chamber is drawn by capillary forces away from the bleed passage and into the capillary ducts.

5. A tubular plotting pen having a writing ink storage space and a writing tube, said plotting pen comprising:

(a) a unitary hard plastic body element having a front end and a rear end, wherein the front end centrally supports the writing tube, which writing tube is connected to the writing ink storage space, which storage space is disposed proximate to a rear end of said body element, wherein said body element has (i) an axially extending pressure-equalization chamber, and (ii) an annular cavity proximate to the front end of said body element, and wherein the pressure-equalization chamber has an upper end that is connected to the writing ink storage space and a lower end that is connected to ambient air through the annular cavity; and (b) a disc element, disposed in the annular cavity, that extends transversely to a longitudinal axis of the plotting pen, said disc element having capillary ducts formed therein.

6. A tubular plotting pen according to claim 5, wherein said disc element has a bleed passage connecting a lower end of the pressure-equalization chamber with the annular cavity, and wherein the capillary ducts are provided on a side of said disc element that faces away from the pressure-equalization chamber.

7. A tubular plotting pen according to claim 5, wherein said disc element further comprises an inner, circular part-capillary duct from which first rectilinear capillary duct sections extend outwardly and intersect second rectilinear duct areas at right angles.

8. A tubular plotting pen according to claim 5, wherein said body element comprises a cylindrical interior surface, and wherein said plotting pen further comprises a soft plastic cartridge that is inserted through an open rear end of said body element into sealing engagement against said cylindrical interior surface of said body element, and wherein said disc element is formed proximate to a front end of said soft plastic cartridge as an integral part thereof.

* * * * *